L. BISSELL.
Car Truck.
No. 21,936.
Patented Nov. 2, 1858.
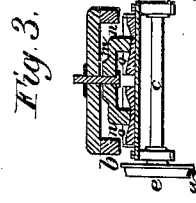
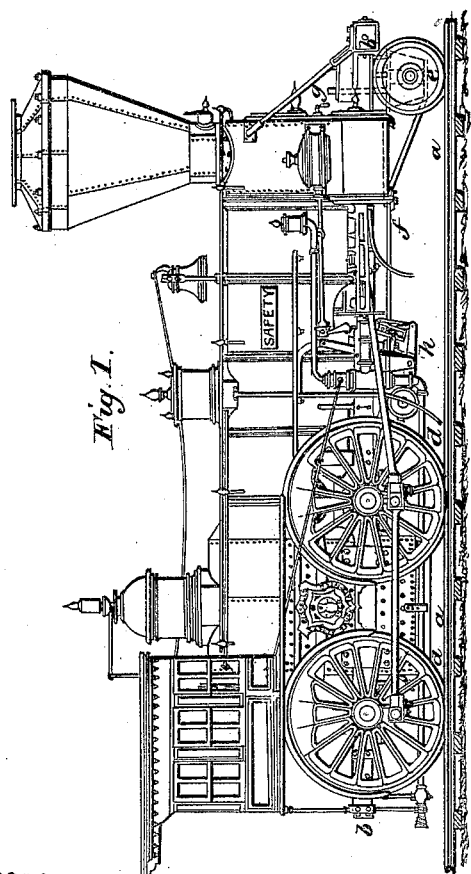
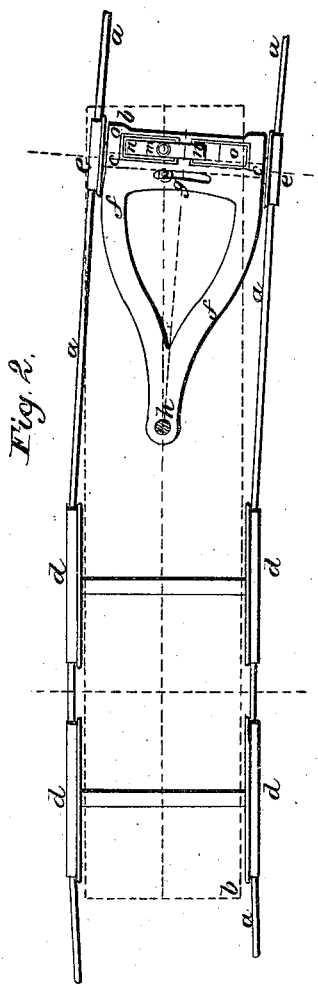

UNITED STATES PATENT OFFICE.

LEVI BISSELL, OF NEW YORK, N. Y.

TRUCK FOR LOCOMOTIVE-ENGINES.

Specification of Letters Patent No. 21,936, dated November 2, 1858.

*To all whom it may concern:*

Be it known that I, LEVI BISSELL, of the city, county, and State of New York, have invented, made, and applied to use a certain new and useful Improvement in Trucks for Locomotive-Engines; and I do hereby declare that the following is a full, clear, and exact description of the construction and operation of the said invention, reference being had to the annexed drawing, making part of this specification, wherein—

Figure 1, is a side view of a locomotive fitted with my improvement, Fig. 2, is a plan showing the position of the truck and wheels on the track, the other parts of the engine being removed, and Fig. 3, is a sectional elevation of the truck and inclined bearing blocks.

Similar marks of reference denote the same parts in all the figures.

In Letters Patent granted to me August 4th, 1857, an engine is shown having a truck with four wheels (or more) and the said truck is so fitted that it turns laterally of the engine to accommodate the curvature of the track, allowing the main driving wheels and engine to occupy a tangential position to the track, while the axles of the truck wheels in consequence of said lateral movement occupy a position parallel to the radial line of the curved track; hence the engine would run around a curve with but little friction or tendency to mount and run off the outer rail. The peculiar points of the said invention and patent will be more fully apparent by reference thereto, suffice to say, that it was contemplated said invention would be mainly applicable to engines having four or more truck wheels; I have however since devised and perfected a manner of applying some features of the aforesaid patent to engines having but two truck wheels.

My present invention therefore is an improvement on the aforesaid patent of August 4th, 1857, and consists in the application of a rigid truck frame set and moving on a fixed center that is located between the center of the driving wheels and the truck wheels, and said frame carries the journal boxes of said truck wheels, and sustains the forward end of the locomotive on double inclined bearing blocks resting on double inclined bearings on said truck frame. By this means two truck wheels can be used in consequence of the fixed center, where the truck frame is attached to the boiler, becoming a bearing point to steady and sustain the two truck wheels, thus providing a secure and durable attachment for a single pair of movable truck wheels on a locomotive engine.

In the drawing *a, a,* are the bars of the track, *b,* is the frame of the engine illustrated by dotted lines in Fig. 2; *d, d,* are the driving wheels, which may be one or more pairs, *e, e,* are the truck wheel on a shaft *c,* that passes through journal boxes set in standards on the frame *f,* and rubber or other springs are to be provided to the aforesaid boxes as usual.

The frame *f* is attached to the underside of the boiler or to the engine frame by a king bolt *h,* which becomes a center of lateral motion for the truck, and also affords a rigid attachment to sustain the frame in a horizontal position and prevent it vibrating from the wheels passing inequalities or obstructions on the track. Between the boiler or the engine frame (*b*) and the said truck frame (*f*) I introduce double inclined bearings, so that the engine rests onto or is connected to the said truck at the center *h,* and the said bearing. These bearings are formed of double inclined blocks *n,* that rest in double inclined boxes *o,* and there may be one two or more of such bearings placed between the engine and the truck in any convenient position, and the inclines (*o, o,*) are to be sufficiently long to allow of the requisite lateral motion of the truck to the right or left. Where two of these bearings are used the blocks *n, n,* are connected to each other by a bar *m,* that is attached to the engine or frame by a center bolt or pin.

In order to prevent the forward part of the truck dropping away from the engine if the latter is raised for repairs or otherwise, a king bolt may be used in a curved slot (*g*) with the head or nut below the frame although the check chains usually employed may be sufficient for this purpose.

It will now be apparent that with two truck wheels I accomplish the purposes set forth in my aforesaid patent where four or more truck wheels were required, for when the engine strikes a curve the driving wheels and engine frame maintain a tangential position with the track in running around the curve, while the truck wheels move laterally on the center *h,* and the axle *c,* comes into the radial line of the curve, while the inertia of the forward part of the engine is counteracted and expended by the bearing blocks $n$, running up the inclines $o$, and partially raising the front part of the engine.

It will now be apparent that the bearing blocks and inclines ($n$, $o$) may be directly over the axle $c$, or to the front or rear of that position, and also that the angle of the inclines must be regulated according to the weight and general velocity of the engine.

When the locomotive is running on a straight track the blocks $n$, resting in the lower part of the bearing $o$, prevent lateral movement or shaking from the operation of the engines.

Having thus described the nature and operation of my said invention, I wish it to be understood that I do not claim a single pair of wheels having a lateral motion as the same have been proposed for carriages, and also for locomotives, but in such cases they have moved on flat bearing plates and there was nothing to prevent the truck from maintaining an angular position to the drivers when traveling on a straight line; but by my invention this is prevented because the inclines, combined and acting as set forth, bring the truck to its proper position as the engine passes off the curve onto a straight track.

What I claim as new and desire to secure by Letters Patent as an improvement on the aforesaid patent of August 4th 1857 is—

The rigid truck frame $f$ attached to the engine by the bolt or pin $h$, and receiving one pair of truck wheels, in combination with the double inclined bearings ($n$, $o$) for the purposes and substantially as specified.

In witness whereof I have hereunto set my signature this first day of October 1858.

LEVI BISSELL.

Witnesses:
LEMUEL W. FERRELL,
THOMAS G. HAROLD.